United States Patent
Fast et al.

(10) Patent No.: US 7,289,905 B2
(45) Date of Patent: Oct. 30, 2007

(54) NAVIGATION GUIDANCE CANCELLATION APPARATUS AND METHODS OF CANCELING NAVIGATION GUIDANCE

(75) Inventors: Todd H. Fast, Huntington Woods, MI (US); Thomas William Creech, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 366 days.

(21) Appl. No.: 10/995,911

(22) Filed: Nov. 24, 2004

(65) Prior Publication Data

US 2006/0111836 A1    May 25, 2006

(51) Int. Cl.
G01C 21/30 (2006.01)
G01C 21/32 (2006.01)

(52) U.S. Cl. .............. 701/210; 701/209; 701/211; 340/995.21

(58) Field of Classification Search ............... 701/209, 701/210, 211; 340/995.21
See application file for complete search history.

(56) References Cited

U.S. PATENT DOCUMENTS

| | | | | |
|---|---|---|---|---|
| 5,410,486 A | * | 4/1995 | Kishi et al. ............... | 701/211 |
| 5,821,880 A | * | 10/1998 | Morimoto et al. ...... | 340/995.21 |
| 5,911,775 A | * | 6/1999 | Tanimoto ............... | 701/210 |
| 5,926,118 A | * | 7/1999 | Hayashida et al. ..... | 340/995.21 |
| 5,931,888 A | * | 8/1999 | Hiyokawa ............... | 701/208 |
| 5,977,885 A | * | 11/1999 | Watanabe ............... | 340/995.19 |
| 6,034,626 A | * | 3/2000 | Maekawa et al. ....... | 340/995.21 |
| 6,061,630 A | * | 5/2000 | Walgers et al. .......... | 701/210 |
| 6,064,941 A | * | 5/2000 | Nimura et al. .......... | 701/210 |
| 6,249,740 B1 | * | 6/2001 | Ito et al. ................... | 701/200 |
| 6,278,942 B1 | * | 8/2001 | McDonough ........... | 701/210 |
| 6,317,687 B1 | * | 11/2001 | Morimoto et al. ....... | 701/211 |
| 6,397,145 B1 | * | 5/2002 | Millington ................ | 701/211 |
| 6,487,496 B2 | * | 11/2002 | Katayama et al. ....... | 701/209 |
| 6,507,785 B1 | * | 1/2003 | Stefan et al. ............ | 701/210 |
| 6,591,185 B1 | * | 7/2003 | Polidi et al. ............. | 701/201 |
| 6,741,928 B2 | * | 5/2004 | Millington et al. ...... | 701/209 |
| 6,859,724 B2 | * | 2/2005 | Komatsu .................. | 701/202 |
| 6,865,480 B2 | * | 3/2005 | Wong ....................... | 701/210 |
| 6,898,516 B2 | * | 5/2005 | Pechatnikov et al. .... | 701/202 |
| 6,917,878 B2 | * | 7/2005 | Pechatnikov et al. .... | 701/210 |
| 6,934,628 B2 | * | 8/2005 | Harada .................... | 701/211 |
| 6,943,701 B2 | * | 9/2005 | Zeineh .................... | 340/988 |
| 6,950,746 B2 | * | 9/2005 | Yano et al. .............. | 701/210 |
| 6,963,801 B2 | * | 11/2005 | Esaki et al. .............. | 701/207 |
| 7,089,110 B2 | * | 8/2006 | Pechatnikov et al. .... | 701/210 |
| 7,149,625 B2 | * | 12/2006 | Mathews et al. ........ | 701/209 |
| 2005/0267681 A1 | * | 12/2005 | Yato ........................ | 701/210 |
| 2005/0273250 A1 | * | 12/2005 | Hamilton et al. ........ | 701/200 |
| 2007/0005233 A1 | * | 1/2007 | Pinkus et al. ............ | 701/200 |

* cited by examiner

*Primary Examiner*—Thomas Black
*Assistant Examiner*—Wae Lenny Louie (57) ABSTRACT

Methods and apparatus are provided for controlling navigation guidance in a vehicle. The method includes: a) determining a re-route instruction based on a non-executed guidance instruction; b) presenting the re-route instruction; c) determining a non-execution of a re-route instruction; d) repeating steps a) through c) for a pre-determined number of re-route attempts; e) prompting for cancellation of navigation guidance after the pre-determined number of re-route attempts; and f) altering navigation guidance upon acceptance of the prompt for alteration.

24 Claims, 4 Drawing Sheets

NAVIGATION GUIDANCE CANCELLATION APPARATUS AND METHODS OF CANCELING NAVIGATION GUIDANCE

TECHNICAL FIELD

The present invention generally relates to electronic navigation, and more particularly relates to navigation guidance systems in a vehicle.

BACKGROUND

Navigation systems generally provide travel guidance to a vehicle driver using map data stored on compact disc read-only memory (CD-ROM) or digital video disc (DVD). Some navigation systems may also obtain current vehicle position data, such as through a global positioning system (GPS). In combination with the map data, such navigation systems may provide travel instructions to guide the driver to a desired destination. In one conventional mode of operation, the navigation system draws a map and a guide route on a display screen, and superimposes a vehicle position mark at a corresponding location on the map. As the present vehicle position varies with movement of the vehicle, the system may move the vehicle position mark along the guide route, or scroll the map with the vehicle position mark fixed at a specific position relative to the display screen. In another conventional mode of operation, the roads intersecting the guide route may be displayed in a simplified manner, and the travel direction at an intersection may be displayed by an arrow. The distance to the intersection, direction toward the destination, distance to the destination, etc., may also be displayed. Additionally, the travel direction at the intersection may be guided by voice output.

To set the route guidance, the driver generally inputs a destination, so that the navigation system can search for a guide route to the destination. Thereafter, the navigation system searches for a guide route to the destination from the present vehicle position for display. In some navigation systems, navigation instructions are provided to the driver via the display. For example, the navigation system may display a series of driving directions, such as traveling between one intersection and another intersection for a certain distance or time and making a variety of turns onto different streets.

In addition, some navigation systems include alerts or warnings that are initiated when the vehicle does not follow a given navigation instruction. Such alerts are displayed to the driver or made apparent to the driver via an audio warning. Further, such alerts may continue indefinitely until the driver returns to the guide route or interacts with the navigation system through a series of steps, such as keying-in or selecting a sequence of menu buttons to end navigation or return the navigation system to a stand-by mode.

Accordingly, it is desirable to provide a vehicle navigation system having a simplified cancellation or suspension of navigation guidance. In addition, it is desirable to provide a method of controlling a vehicle navigation system having a single prompt for input to cancel or suspend navigation guidance after a pre-determined number of non-executed navigation instructions. Furthermore, other desirable features and characteristics of the present invention will become apparent from the subsequent detailed description and the appended claims, taken in conjunction with the accompanying drawings and the foregoing technical field and background.

BRIEF SUMMARY

A method is provided for controlling a vehicle navigation guidance system. a) determining a re-route instruction based on a non-executed guidance instruction; b) presenting the re-route instruction; c) determining a non-execution of a re-route instruction; d) repeating steps a) through c) for a pre-determined number of re-route attempts; e) prompting for alteration of navigation guidance after the pre-determined number of re-route attempts; and f) altering navigation guidance upon acceptance of the prompt for alteration.

A navigation system in a vehicle is provided. The navigation system comprises a display unit configured to display navigation information and a first control input display element, an input element coupled to the display unit, and a control system coupled with said display unit and said input element. The navigation information is based on a pre-determined travel route for the vehicle. The input element is configured to select the first control input display element. The control system is configured to generate a dialog box on the display unit upon a pre-determined number of non-executed re-route commands, and cancel display of navigation information upon the input element selecting the first control input display element. The dialog box contains the first control input display element and comprises a prompt for navigation guidance cancellation.

A computer program product is provided for a vehicle navigation system having a display unit configured to display a graphical user interface and navigation information. The computer program product comprises a computer system useable medium having computer system readable code embodied therein for managing the graphical user interface, a first computer system readable code device configured to cause a computer system to generate a dialog box in the display unit upon a pre-determined number of non-executed re-route directions, and a second computer system readable code device configured to cause the computer system to alter display of navigation information upon selecting the control input display element. The dialog box has a navigation guidance alteration prompt and a control input display element.

A vehicle navigation system is provided comprising a display device configured to display navigation information, an operator input device coupled to the display device, and audio output device, a dialog box enabling element, and an audio enabling element. The dialog box enabling element is configured to enable the display device to display a dialog box upon a pre-determined number of non-executed re-route instructions. The dialog box has a navigation guidance alteration prompt and at least one control input display element. The dialog box enabling element is further configured to enable the display device to alter display of navigation information based on a selection of the control input display element by the operator input device in connection with the dialog box. The audio enabling element is configured to output audio signals corresponding to the navigation guidance alteration prompt.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
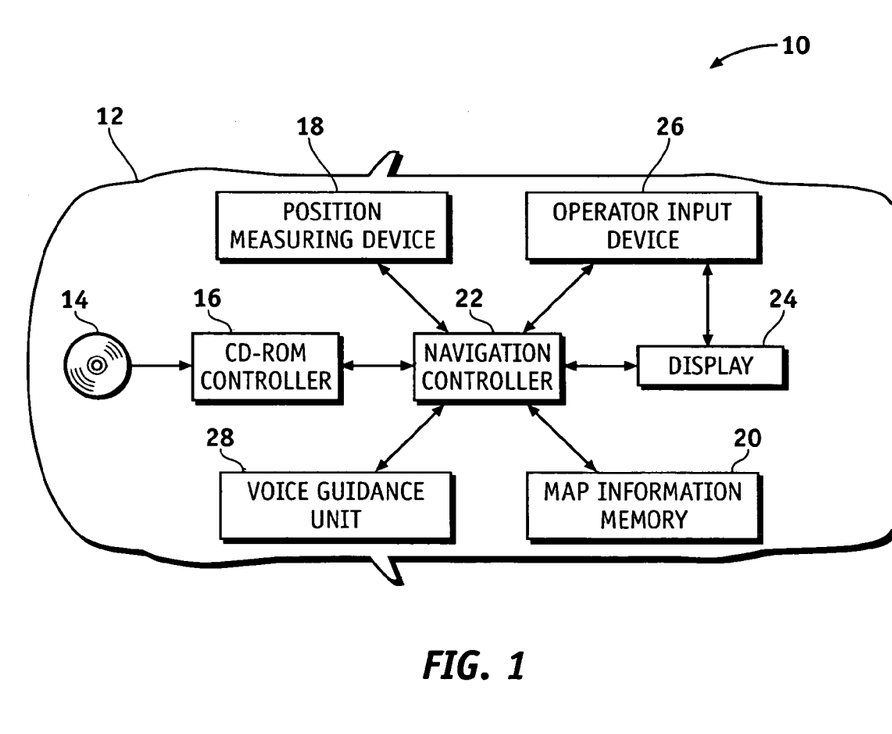
FIG. 1 is a block diagram of a vehicle navigation guidance system in accordance with an exemplary embodiment of the present invention.

Referring to the drawings, FIG. 1 is a block diagram of a vehicle navigation guidance system 10 in a vehicle 12 in accordance with an exemplary embodiment of the present invention. It should be appreciated that the blocks of FIG. 1 (as well as the blocks in the other diagrams disclosed herein) can represent functional elements and discrete hardware elements. For example, in one embodiment of the invention, some of the functions or hardware elements illustrated in FIG. 1 may be implemented in a single processor unit. Alternatively, a portion of the functions may be implemented in a single processor unit in combination with hardware elements. The functions can be implemented in hardware, all in software, or a combination of hardware and software can be used.

The navigation guidance system 10 includes a display device 24 displaying guidance information, a navigation controller 22 coupled to a display device 24, and an operator input device 26 coupled with the display device 24 and the navigation controller 22 to receive selections from an operator as provided on the display device 24 by the navigation controller 22. Based on a selected travel route, navigation guidance information may be provided on the display device 24, such as route directions or instructions to get from a starting point or a current location to a destination. In the event of the vehicle 12 strays from the selected travel route, the navigation controller 22 determines a re-route instruction to return the vehicle 12 to the selected travel route. The display device 24 displays the re-route instruction.

In an exemplary embodiment, during operation of the navigation guidance system, a pop-up dialog box is displayed on the display device 24 after a pre-determined number of non-executed re-route instructions by the vehicle. The pop-up dialog box includes a prompt to cancel navigation guidance, as described in greater detail hereinbelow. After the operator indicates agreement to cancel navigation guidance, such as by using the operator input device 26, the navigation controller 22 cancels the display of navigation information and cancels or suspends navigation guidance.

The navigation guidance system 10 may further include a map storage medium 14 that contains map information, for example, a compact disc read only memory (CD-ROM), a CD-ROM controller 16 that reads the map information from the CD-ROM 14, and a position measuring device 18 that measures a present vehicle position. In another exemplary embodiment, the map storage medium 14 may be a digital video disc (DVD), and a DVD controller is used to read the map information from the DVD. The particular type of storage medium is not critical to the operation of the navigation guidance system 10 so long as the selected storage medium has sufficient storage capacity for map information. Any variety of conventional storage medium with an associated controller for reading such storage medium may be used. Other conventional components (not shown) for determining changes to position and relative location of the vehicle 12 may also be included with the position measuring device 18 including, but not limited to, a speed sensor to detect a travel distance, a gyro to detect a travel direction, a central processing unit (CPU) for position calculation, and a global positioning system (GPS) receiver. The navigation guidance system 10 may also include a map information memory 20 to store map information retrieved from the CD-ROM 14 or DVD.

The display device 24 may be a rear projection display, such as a cathode ray tube (CRT), or a panel display such as a liquid crystal display (LCD) monitor. Additionally, the display device 24 may be a heads-up display (HUD) that projects images of the display onto a desired plane, such as a wind-shield. The display device 24 may be other conventional displays that provide readily viewable displayed images or information to the operator.

The navigation controller 22 controls the entire navigation system 10 and may store various control programs. For example, the navigation controller 22 may generate a map guide image based on the map information as well as menu images/list images corresponding to the travel route. Additionally, the navigation controller generally provides navigation information corresponding to the selected travel route. The map information memory 20 stores guide routes and processed results of the navigation controller, such as re-route instructions. Additionally, the map information memory 20 may store points of interests in various categories (e.g., hotels, restaurants, airports, stations, shopping malls, sporting facilities, hospitals, golf courses, etc.). A voice guide unit 28 may optionally be coupled to the navigation controller 22 that guides the travel instruction by voice output.

In one exemplary embodiment, the navigation controller 22 determines navigation instructions based on the current position of the vehicle 12 in relation to the travel route. As previously mentioned, the navigation controller 22 determines re-route instructions, based on a current errant position of the vehicle 12 in relation to the travel route, to return the straying vehicle to the travel route.

Figure 2:
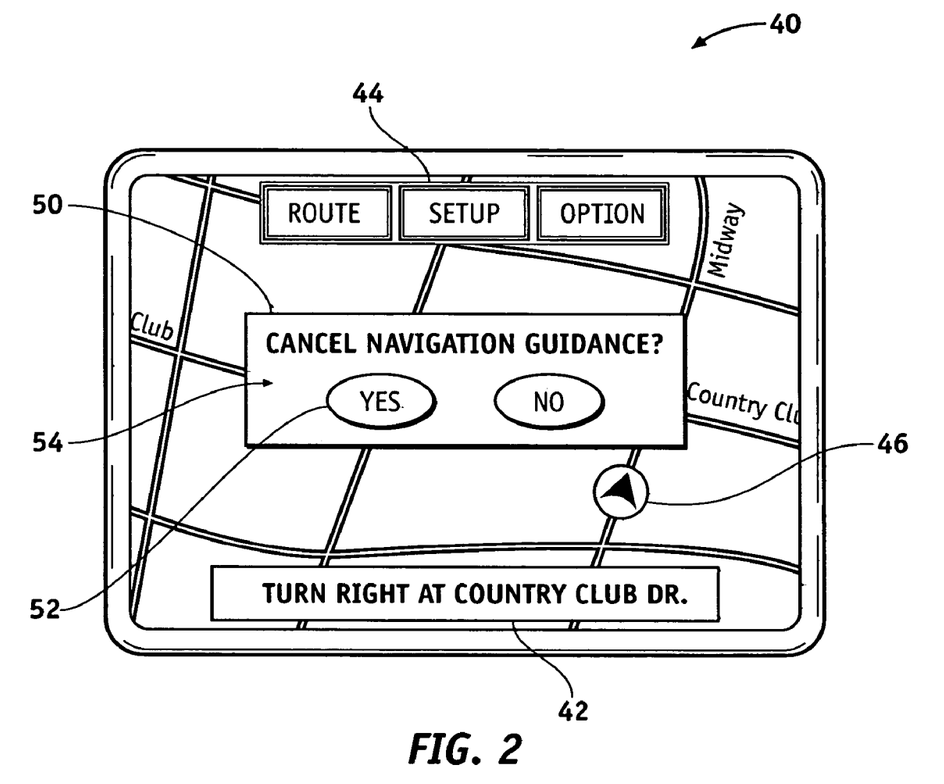
FIG. 2 is an illustration of a first exemplary embodiment of a navigation guidance display.

FIG. 2 is an illustration of a first exemplary embodiment of a navigation guidance display 40. The navigation guidance display 40, such as of the display device 24 shown in FIG. 1, presents navigation guidance information, such as a map representation of the selected travel route or a portion thereof, textual instructions 42, and a vehicle identifier 46. Additionally, the navigation guidance display may present a display toolbar 44 that may be used to change the display of information on the navigation guidance display 40.

One technique for presenting information to users of computer-based systems is through a graphical user interface (GUI). A GUI is typically part of an environment provided by an operating system that is executed by a processor in the computer system: Generally, the GUI is controlled by the operating system in response to commands provided by a user and application programs or other processes executing on or accessible to the computer-based system. In the navigation guidance system 10, the operating system may be stored in a system memory, such as the map information memory 20 or other memory, and the navigation controller 22 executes the operating system. Although the operating system is described in with respect to execution by the navigation controller 22, a separate processing unit or processor may be coupled to the navigation controller to execute the operating system and instruct the navigation controller 22 to control the various components of the navigation guidance system.

Common to virtually all conventional GUIs is the use of a mouse or other pointing device in a windowed environment. Windows are rectangular areas presented on a display that contain textual and/or graphical information related to the operation of the application program, operating system, or other processes. Generally, additional display elements are provided by the GUI to facilitate interactions with the windows. These include, for example, menus, title bars, buttons, select boxes and icons.

In one exemplary embodiment, the operator interacts with the navigation guidance system by manipulating a cursor displayed on the GUI with the operator input device 26 (FIG. 1), such as a pointing device. Examples of pointing devices include a control knob, joystick, and trackball. To enter information into the computer system, the operator may interact with a displayed window. In another exemplary embodiment, the operator input device 26 (FIG. 1) may be a touch-sensitive surface that is coupled to the display device 24 (FIG. 1), such as over-laying onto a display screen.

The navigation instructions, including re-route instruction, determined by the navigation controller 22 (FIG. 1) may be displayed on the GUI. Travel instructions by voice output from the voice guide unit 28 (FIG. 1) may also notify the operator of the re-route instruction. After the pre-determined number of non-executed re-route instructions, a dialog box 50 is displayed on the display 40. This pre-determined number may be manufacturer defined or operator defined and stored in the system memory.

The dialog box is displayed on the GUI to enable the operator to enter specific information into the computer system. Dialog boxes are special windows presented on the GUI to facilitate providing inputs to the navigation guidance system 10 (FIG. 1) to control application programs or other processes occurring within or accessible to the computer system. Dialog boxes generally present logically related control input display elements, such as fields for numeric or text entry, icons, select boxes, buttons and a myriad of other known display elements that enable an operator to set parameters or otherwise affect control of a desired process or system.

In one exemplary embodiment, the dialog box 50 is an active dialog box that is launched or invoked and pops-up on the display 40 after the pre-determined number of non-executed re-route instructions have been displayed on the display 40. The dialog box 50 is established to receive an operator input corresponding to alteration of navigation guidance, such as acceptance of cancellation of navigation guidance. In this embodiment, the dialog box 50 includes a text prompt 54 for canceling navigation guidance and buttons 52 to accept such prompt or continue with navigation guidance. With the touch-sensitive screen 26 (FIG. 1), the operator may simply touch the region of the screen 26 (FIG. 1) corresponding to the button 52 accepting cancellation of navigation guidance. Upon accepting cancellation of navigation guidance, the navigation controller 22 discontinues determining navigation information and the display returns to a non-navigation mode.

Figure 3:
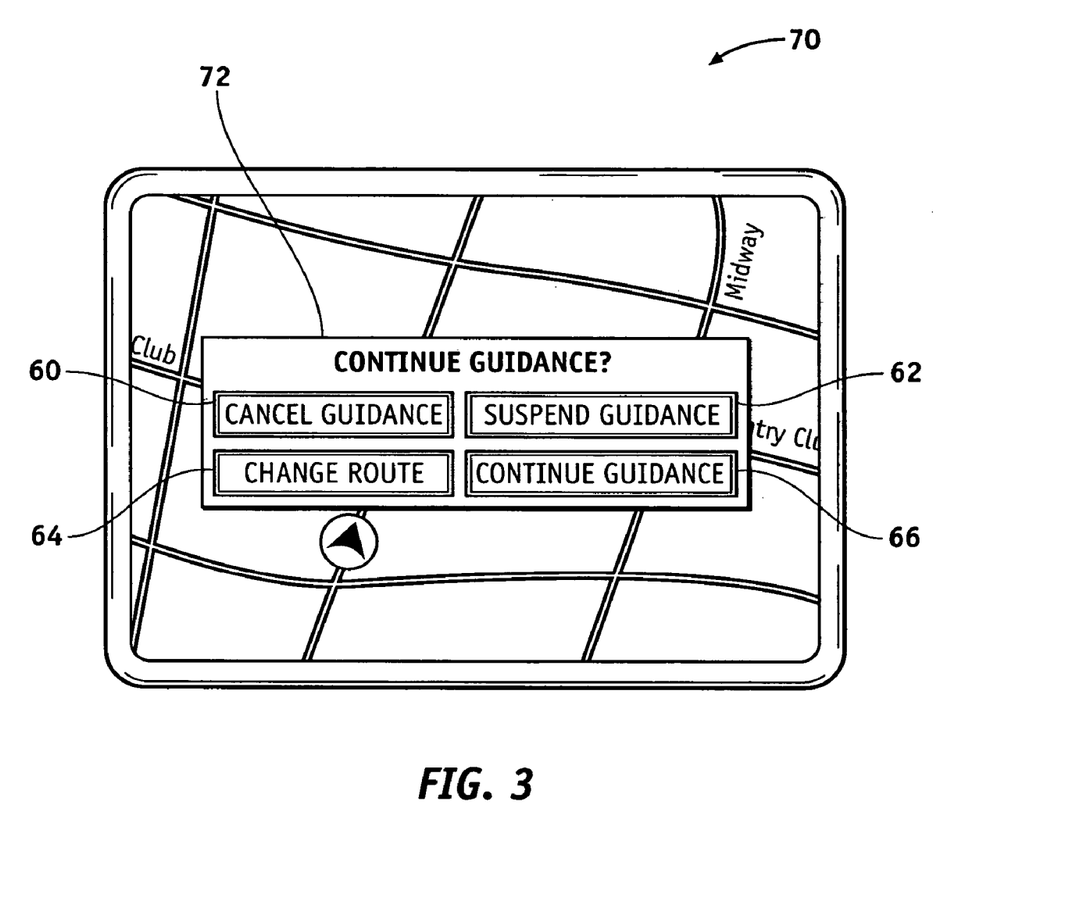
FIG. 3 is an illustration of a second exemplary embodiment of a navigation guidance display.

FIG. 3 is an illustration of a second exemplary embodiment of a navigation guidance display 70. In this exemplary embodiment, the dialog box 72 includes a text prompt for continuing navigation guidance and buttons to accept different options of navigation guidance. For example, the dialog box 70 includes a button for canceling guidance 60, a button for suspending guidance 62, a button for changing route 64, and a button to continue guidance 66. Additionally, the prompt for continuing navigation guidance as well as the different navigation guidance options, such as the aforementioned buttons 60, 62, 64, 66, may be verbalized using the voice guidance unit 28 (FIG. 1).

When the suspend guidance button 62 is selected, the navigation controller 22 (FIG. 1) may continue monitoring and determining the current position of the vehicle 12 (FIG. 1) in relation to the travel route while suspending determination and display of re-route instructions or guidance instructions corresponding to the travel route. When the change route button 64 is selected, the navigation controller 22 (FIG. 1) may display a new screen queering the operator for information regarding a new destination. When the continue guidance button 66 is selected, the navigation controller 22 (FIG. 1) may re-display guidance instructions for the original route. Although not specifically detailed herein, additional guidance buttons are available for selection, either alone or in combination with one or more guidance buttons.

Although the foregoing embodiments have been described with regard to a display having a touch-sensitive screen over-laid onto the display, various other operator inputs may be implemented with the navigation guidance system. For example, when using a HUD, a control knob or touch pad that is readily accessible by the operator may be used even when such operator input devices may not physically be coupled with the HUD. Additionally, a HUD make be used in addition to an in-dash mounted navigation system having one display to provide a more convenient second display on a front windshield. In this example, the operator may continue to input selections using a touch-screen, as previously detailed hereinabove.

Through the navigation controller 22 (FIG. 1), the operating system controls the execution of other computer programs, such as the GUI and a dialog box control system, and provides scheduling, input/output control, file and data management, memory management, and related services. The navigation controller 22 (FIG. 1) and operating system define a computer platform for which application programs and high-level programming languages are written. One or more buses (not shown) may be used to connect various components of the navigation guidance system 10 (FIG. 1). For example, the interconnection via a system bus allows the navigation controller 22 (FIG. 1) to communicate with each component or subsystem and to control the execution of instructions from system memory and the exchange of information between such components. Other arrangements of components and interconnections are possible.

In one exemplary embodiment, the dialog box control system is implemented in software routines which interoperate with the components of the navigation guidance system 10 (FIG. 1) to perform the aforementioned dialog box functions. Such software routines typically reside in system memory, such as the map information memory 20 (FIG. 1), and may be stored on any other computer-readable medium such as, for example, magnetic disk, compact disc or magnetic tape, and may be loaded into the navigation guidance system using an appropriate peripheral device as known in the art. The dialog box control system may be implemented in a well-known object-oriented programming language such as C++. Those skilled in the art will appreciate that different implementations, including different function names, programming languages, data structures, and/or algorithms may also be used in embodiments of the present invention other than those described below. It should be further understood that the invention is not limited to a particular computer platform, particular operating system, particular processor, or particular high level programming language, and that the hardware components identified above are given by way of example only. The dialog box control system may be implemented, for example, in dedicated hardware, firmware, or any combination thereof.

Figure 4:
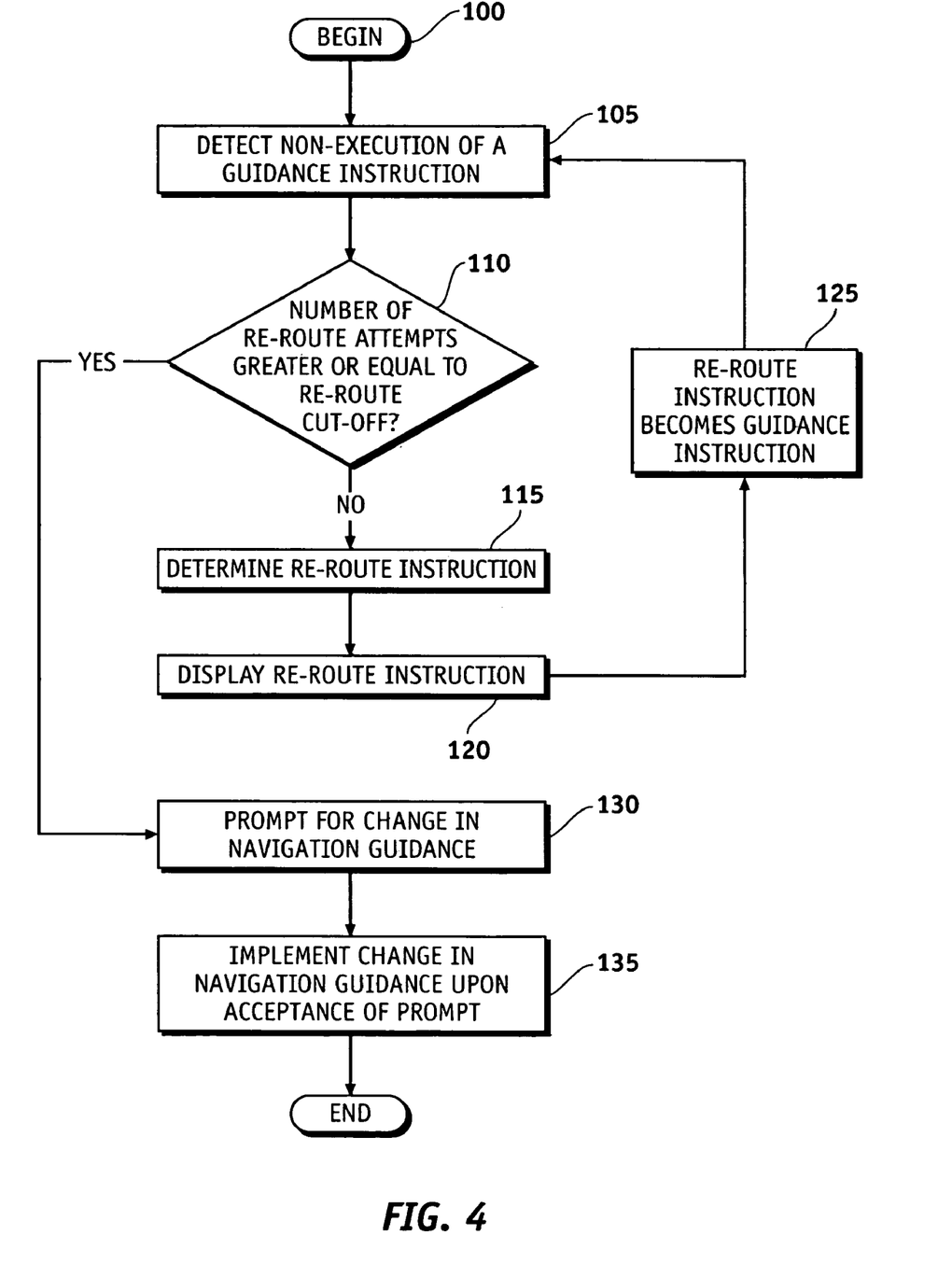
FIG. 4 is a flow diagram of a method of controlling vehicle navigation in accordance with an exemplary embodiment of the present invention.

FIG. 3 is a flow diagram of a method of controlling vehicle navigation in accordance with an exemplary embodiment of the present invention. The method begins at step 100. In the course of providing navigation guidance instructions based on the selected route, the navigation controller 22 (FIG. 1) detects for a non-execution of a guidance instruction at step 105. This detection may be accomplished through communication between the navigation controller 22 (FIG. 1) and the position measuring device 18 (FIG. 1) and comparing the current position of the vehicle 12 (FIG. 1) with the selected route.

In the event that a non-execution of the guidance instruction is detected, the navigation controller 22 (FIG. 1) determines whether the current re-route attempt has exceeded the pre-determined number of re-route attempts, such as a cut-off or threshold number, at step 110. This determination may be a simple comparison of values, such as where the navigation controller 22 (FIG. 1) includes a counter tracking re-route attempts and compares the same with a stored value.

If the number of re-route attempts has not exceeded the pre-determined number, the navigation controller 22 (FIG. 1) determines a re-route instruction at step 115. The navigation controller 22 (FIG. 1) may compare the current position or location of the vehicle 12 (FIG. 1), such as by using the position measuring device 18 (FIG. 1), with the selected route and determine a new set of re-route instructions to return the vehicle 12 (FIG. 1) to the selected route or to the destination.

The re-route instruction is displayed on the display device 24 (FIG. 1) at step 120. The re-route instruction becomes the guidance instruction at step 125 for purposes of detecting non-executed guidance instructions. For example, the navigation controller 22 (FIG. 1) may count a series of non-executed guidance instructions, that include re-route instructions, based on an original selected route or based on a new route to the same destination but having a different continuing or starting point, such as a current off-route position.

If the number of re-route attempts has exceeded the pre-determined number, the navigation controller 22 (FIG. 1) generates a dialog box 50 (FIG. 2) that pops-up on the display device 24 (FIG. 1) at step 130, such as shown in FIG. 2. The dialog box 52 (FIG. 2) contains a prompt 54 (FIG. 2) for a change in navigation guidance, such as a cancellation of navigation guidance, and a control input display element 52 (FIG. 2) for accepting such cancellation. In another exemplary embodiment, the dialog box 72 (FIG. 3) contains a prompt for continuing navigation guidance and pre-determined selection buttons for canceling guidance 60, suspending guidance 62, changing route 64, and continuing guidance 66. Any number of variations on navigation guidance and corresponding prompts may also be implemented.

In one exemplary embodiment, navigation guidance is cancelled by the navigation controller 22 (FIG. 1) upon acceptance of the prompt 52 (FIG. 2) at step 135. Acceptance of the prompt 52 (FIG. 2) may be accomplished by touching the region of the touch-screen 26 (FIG. 1) over the display device 24 (FIG. 1) associated with the corresponding control input display element 52 (FIG. 2). In another exemplary embodiment, a corresponding change to navigation guidance is implemented upon acceptance of the prompt, as best shown in FIG. 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of controlling a vehicle navigation guidance system, the method comprising the steps of:
   a) determining a re-route instruction based on a non-executed guidance instruction;
   b) presenting the re-route instruction;
   c) determining a non-execution of the re-route instruction;
   d) repeating said step a) through said step c) for a pre-determined number of re-route attempts;
   e) prompting for alteration of navigation guidance after repeating step a) through c) for the pre-determined number of re-route attempts and determining the non-execution of the re-route instruction for each of the pre-determined number of re-route attempts; and
   f) altering navigation guidance upon acceptance of the prompt for alteration of navigation guidance.

2. A method of controlling a vehicle navigation guidance system according to claim 1, wherein the non-executed guidance instruction is a pre-determined instruction along a pre-determined path of travel; and
   wherein said step a) comprises determining a route to return to the pre-determined path of travel.

3. A method of controlling a vehicle navigation guidance system according to claim 1, wherein said presenting step comprises at least one step selected from:
   displaying the re-route instruction; and
   verbalizing the re-route instruction.

4. A method of controlling a vehicle navigation guidance system according to claim 1, wherein the pre-determined number of re-route attempts is selected from a user-defined value and a manufacturer pre-set value.

5. A method of controlling a vehicle navigation guidance system according to claim 1, wherein said prompting step comprises at least one step selected from:
   displaying a dialog box comprising a text requesting an alteration to navigation guidance and at least one control input display element selected from a button, a select box, and an icon; and
   verbalizing a request to alter navigation guidance.

6. A method of controlling a vehicle navigation guidance system according to claim 5, wherein said step f) comprises altering navigation guidance upon selection of the control input display element.

7. A method of controlling a vehicle navigation guidance system according to claim 5, wherein said displaying step comprises displaying at least one control input display element selected from:
   a first control input display element for canceling navigation guidance;

a second control input display element for suspending navigation guidance;

a third control input display element for changing route; and a fourth control input display element for continuing navigation guidance.

8. A navigation system in a vehicle, said navigation system comprising:

a display unit configured to display navigation information and a first control input display element, said navigation information based on a pre-determined travel route for the vehicle;

an input element coupled to said display unit, said input element configured to select said first control input display element; and a control system coupled with said display unit and said input element, said control system configured to:

generate a dialog box on said display unit after presenting a pre-determined number of non-executed re-route navigation instructions, said dialog box containing said first control input display element, said dialog box comprising a prompt for navigation guidance alteration; and alter display of navigation information upon said input element selecting said first control input display element.

9. A navigation system according to claim 8, wherein said input element is selected from a touch-sensitive screen, a push-button, a control-stick, and a voice-activated sensor.

10. A navigation system according to claim 8, wherein said control system is further configured to:

determine a navigation instruction corresponding to a pre-determined travel route; and enable display of said navigation instruction on said display unit.

11. A navigation system according to claim 10, wherein said control system is further configured to:

detect a non-execution of said navigation instruction;

determine said re-route navigation instruction based on said pre-determined travel route and a current position of the vehicle; and display said re-route navigation instruction.

12. A navigation system according to claim 8, wherein said first control input display element corresponds to a cancel navigation guidance prompt; and wherein said control system is further configured to cancel navigation guidance upon said input element selecting said first control input display element.

13. A navigation system according to claim 8, wherein said display unit is further configured to display in said dialog box at least one control input display element selected from a second control display element corresponding to a suspend navigation guidance prompt a third control display element corresponding to a change route prompt, and a fourth control input display element corresponding to a continue prompt; and wherein said control system is further configured to:

suspend display of navigation information upon said input element selecting said second control input display element;

change a route upon said input element selecting said third control display element; and continue display of navigation information upon said input element selecting said fourth control input display element.

14. A navigation system according to claim 8, wherein said display unit is selected from a liquid crystal display (LCD), a cathode ray tube (CRT), and a heads-up display.

15. A navigation system according to claim 8, wherein said prompt for navigation guidance alteration of said dialog box is selected from a text prompt and a voice prompt.

16. A computer program product for a vehicle navigation system having a display unit configured to display a graphical user interface and navigation information, said computer program product comprising:

a computer system useable medium having computer system readable code embodied therein for managing the graphical user interface; and a first computer system readable code device configured to cause a computer system to generate a dialog box in the display unit after presenting a pre-determined number of non-executed re-route navigation instructions, said dialog box having a navigation guidance alteration prompt and a control input display element; and a second computer system readable code device configured to cause said computer system to alter display of navigation information: upon selecting said control input display element.

17. A computer program product according to claim 16, wherein said control input display element is selected from a button, a select box, and an icon.

18. A computer program product according to claim 16 further comprising a third computer system readable code device configured to generate a voice message corresponding to said navigation guidance alteration prompt.

19. A computer program product according to claim 16, wherein said first computer system readable code device is further configured to cause the computer system to generate a text message in said dialog box corresponding to said navigation guidance alteration prompt.

20. A computer program product according to claim 16, wherein said first computer system readable code device is further configured to cause the computer system to generate at least one control input display element in said dialog box selected from a second control input display element corresponding to a suspend navigation guidance prompt, a third control input display element corresponding to a change route prompt, and a fourth control input display element corresponding to a continue navigation guidance prompt.

21. A computer program product according to claim 20 further comprising a third computer system readable code device configured to cause the computer system to suspend display of navigation information in the display change a route for display of navigation information, and continue display of navigation information in the display.

22. A vehicle navigation system comprising:

a display device configured to display navigation information;

an operator input device coupled to said display device;

an audio output device;

a dialog box enabling element configured to:

enable said display device to display a dialog box after presenting a pre-determined number of non-executed re-route navigation instructions, said dialog box having a navigation guidance alteration prompt and at least one control input display element; and enable said display device to alter display of navigation information, based on a selection of said at least one control input display element by said operator input device in connection with said dialog box; and an audio enabling element configured to output audio signals corresponding to said navigation guidance alteration prompt.

23. A vehicle navigation system according to claim 22, wherein said dialog box enabling element is further configured to enable said display device to alter display of navigation information upon selection of said control input display element of said dialog box.

24. A vehicle navigation system according to claim 22, wherein said at least one control input display element is selected from a first control input display element corresponding to a cancel navigation guidance alteration prompt, a second control input display element corresponding to a suspend navigation guidance alteration prompt, a third control input display element corresponding to a change route prompt, and a fourth control input display element corresponding to a continue navigation guidance prompt.

\* \* \* \* \*